United States Patent [19]

Szasz

[11] Patent Number: 5,633,463
[45] Date of Patent: May 27, 1997

[54] EARTHQUAKE DETECTOR

[76] Inventor: Attila Szasz, 12-33499 Marshall Rd., Abbotsford, BC, Canada, V2S-1K8

[21] Appl. No.: 539,194

[22] Filed: Oct. 4, 1995

[51] Int. Cl.$^6$ .............................. G01V 1/18; G08B 21/00
[52] U.S. Cl. .................. 73/654; 367/182; 340/690; 181/122; 200/61.45 R
[58] Field of Search .............................. 73/652, 654, 649; 181/122; 367/182, 179; 340/540, 566, 580, 601, 689, 669, 690; 200/61.45 R, 61.48, 61.47, 61.5, 52 R

[56] References Cited

U.S. PATENT DOCUMENTS

| | | | |
|---|---|---|---|
| 3,626,364 | 12/1971 | Simon et al. | 367/185 |
| 4,368,525 | 1/1983 | Obata et al. | 367/165 |
| 4,945,347 | 7/1990 | Perry | 340/690 |
| 5,285,032 | 2/1994 | Robbinette | 200/61.48 |
| 5,414,677 | 5/1995 | Feagin, Jr. et al. | 73/652 |
| 5,418,523 | 5/1995 | Anderson et al. | 340/690 |

Primary Examiner—Hezron E. Williams
Assistant Examiner—Rose M. Miller

[57] ABSTRACT

An earthquake detector including a platform fixedly coupleable to a recipient surface for receiving vibrations generated as a result of an earthquake; a spring-loaded frame secured to the platform; an alarm mechanism coupled to the spring-loaded frame for providing an alarm when the platform and frame are shaken; and a counterweight coupled to the frame for damping its vibration.

4 Claims, 3 Drawing Sheets

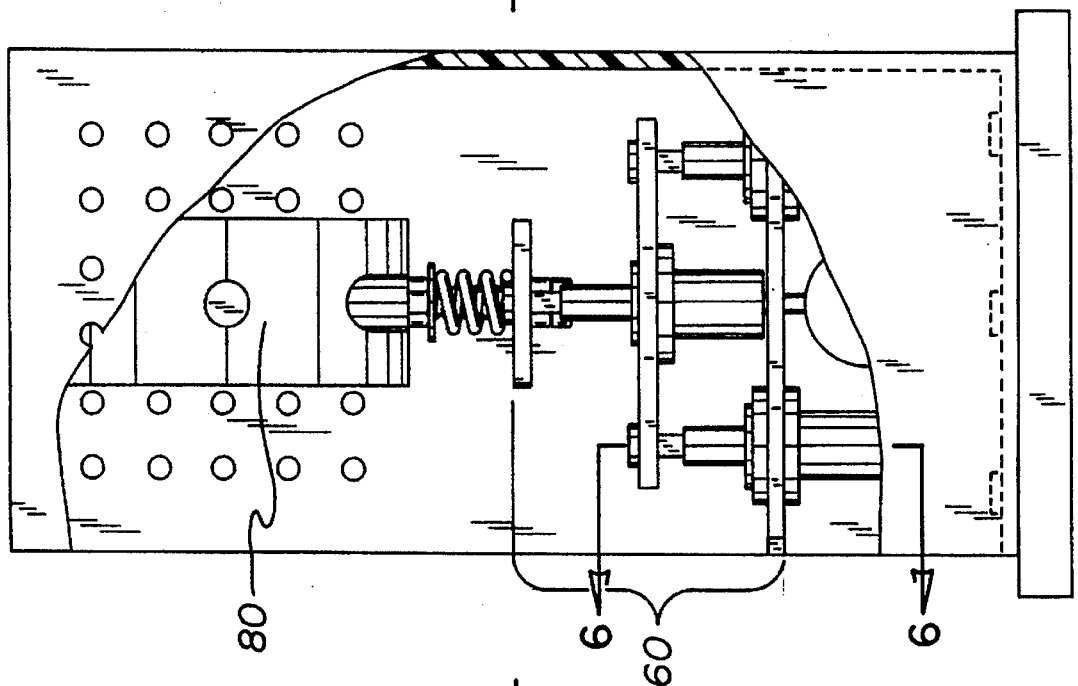
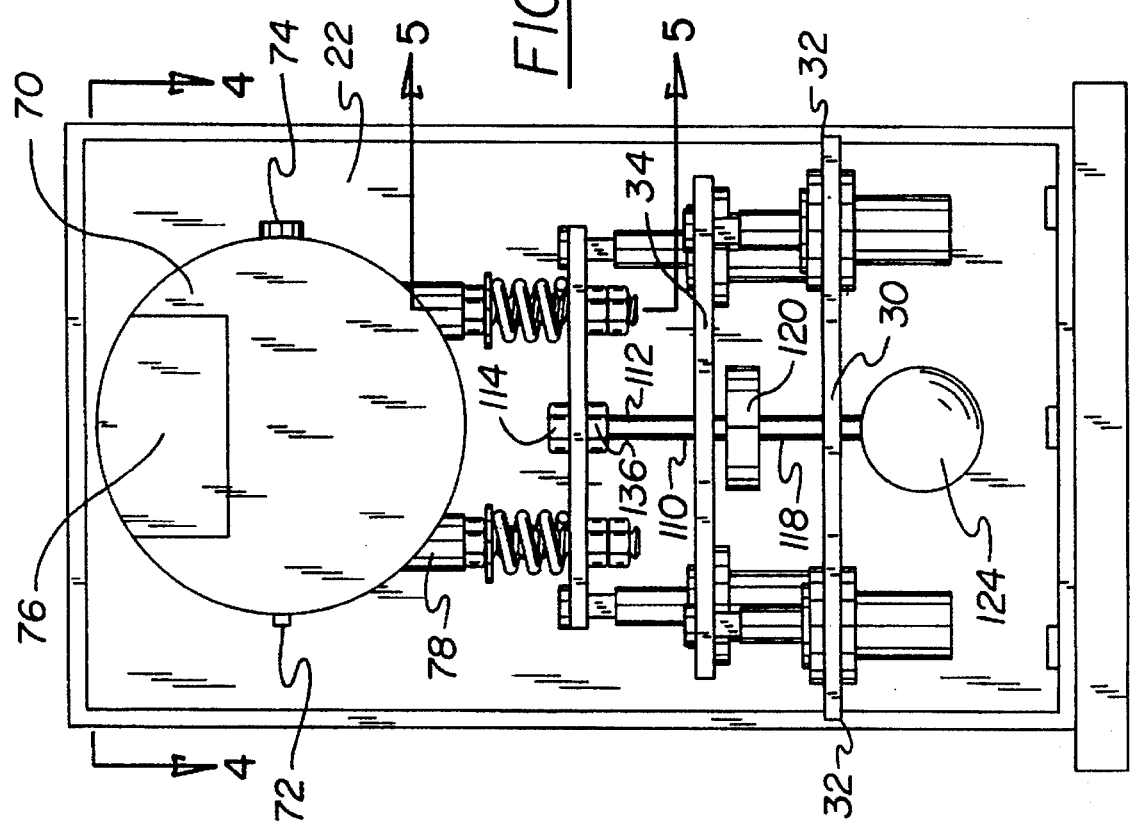

EARTHQUAKE DETECTOR

BACKGROUND OF THE INVENTION

1. Field of the Invention

The present invention relates to an earthquake detector and more particularly pertains to detecting an earthquake and providing an alarm with an earthquake detector.

2. Description of the Prior Art

The use of earthquake detectors is known in the prior art. More specifically, earthquake detectors heretofore devised and utilized for the purpose of detecting earthquakes are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 350,903 to Chern discloses a combined earthquake warning indicator and anti-theft clock. U.S. Pat. No. 4,297,690 to Baker discloses an earthquake alarm system. U.S. Pat. No. 4,484,186 to Wood et al. discloses an earthquake indicator. U.S. Pat. No. 4,764,761 to Maguire, III discloses an earthquake alarm. U.S. Pat. No. 5,184,889 to Vasquez discloses an earthquake indicator light apparatus. U.S. Pat. No. 5,278,540 to Caban-Domenech discloses an electromechanical earthquake alarm.

While these devices fulfill their respective, particular objective and requirements, the aforementioned patents do not describe an earthquake detector that is simple in design and detects earthquakes that exceed a given value on the Richter scale.

In this respect, the earthquake detector according to the present invention substantially departs from the conventional concepts and designs of the prior art, and in doing so provides an apparatus primarily developed for the purpose of detecting an earthquake and providing an alarm.

Therefore, it can be appreciated that there exists a continuing need for new and improved earthquake detector which can be used for detecting an earthquake and providing an alarm. In this regard, the present invention substantially fulfills this need.

SUMMARY OF THE INVENTION

In the view of the foregoing disadvantages inherent in the known types of earthquake detectors now present in the prior art, the present invention provides an improved earthquake detector. As such, the general purpose of the present invention, which will be described subsequently in greater detail, is to provide a new and improved earthquake detector and method which has all the advantages of the prior art and none of the disadvantages.

To attain this, the present invention essentially comprises, in combination, a planar rectangular platform fixedly coupleable to a recipient surface for receiving vibrations generated as a result of an earthquake. A rigid box-shaped housing is provided and has an open front, a bottom wall coupled to the platform, a back wall, and a pair of opposed and perforated side walls that are coupled to the top wall, bottom wall, and back wall. A frame is included and disposed within the housing. The frame has a central axis, an axially aligned planar rectangular horizontal bottom shelf fixedly coupled between the side walls of the housing, an axially aligned planar rectangular horizontal intermediate shelf located above and coupled to the bottom shelf, and an axially aligned planar rectangular horizontal top shelf located above and coupled to the intermediate shelf. The bottom shelf has a rectangular axial bore disposed therethrough. The intermediate shelf has a circular axial bore disposed therethrough and a dimension smaller than that of the bottom shelf. The top shelf has a dimension smaller than that of the intermediate shelf. The positioning of the shelves defines a generally pyramidic arrangement.

An alarm mechanism is included and disposed within the housing at a location above the frame. The alarm mechanism sounds an alarm when vibrated at a level that exceeds about 3.0 on the Richter scale. A spring mechanism is included and coupled between the frame and the alarm mechanism for transferring vibrations to the alarm mechanism when the platform and frame are shaken. Lastly, a counterweight is also provided and disposed within the housing for damping frame vibration. The counterweight has an upper end coupled to the top shelf, a central shaft portion extended downward through the bores of the shelves, a bumper coupled to the shaft portion at a location between the bottom shelf and the intermediate shelf, and a lower end with a bob secured thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved earthquake detector which has all the advantages of the prior art earthquake detectors and none of the disadvantages.

It is another object of the present invention to provide a new and improved earthquake detector which may be easily and efficiently manufactured and marketed.

It is a further object of the present invention to provide a new and improved earthquake detector which is of durable and reliable construction.

An even further object of the present invention is to provide a new and improved earthquake detector which is susceptible of a low cost of manufacture with regard to both materials and labor, and which accordingly is then susceptible of low prices of sale to the consuming public, thereby making such an earthquake detector economically available to the buying public.

Still yet another object of the present invention is to provide a new and improved earthquake detector which provides in the apparatuses and methods of the prior art some of the advantages thereof, while simultaneously overcoming some of the disadvantages normally associated therewith.

Even still another object of the present invention is to provide a new and improved earthquake detector for detecting an earthquake and providing an alarm.

Lastly, it is an object of the present invention to provide a new and improved earthquake detector comprising a platform fixedly coupleable to a recipient surface for receiving vibrations generated as a result of an earthquake; a spring-loaded frame secured to the platform; an alarm mechanism coupled to the spring-loaded frame for providing an alarm when the platform and frame are shaken; and a rigid counterweight coupled to the frame for damping its vibration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side-elevational view of the preferred embodiment of the present invention.

FIG. 3 is a side-elevational fragmentary view of the preferred embodiment of the present invention.

The same reference numerals refer to the same parts through the various Figures.

DESCRIPTION OF THE PREFERRED EMBODIMENT

Figure 1:
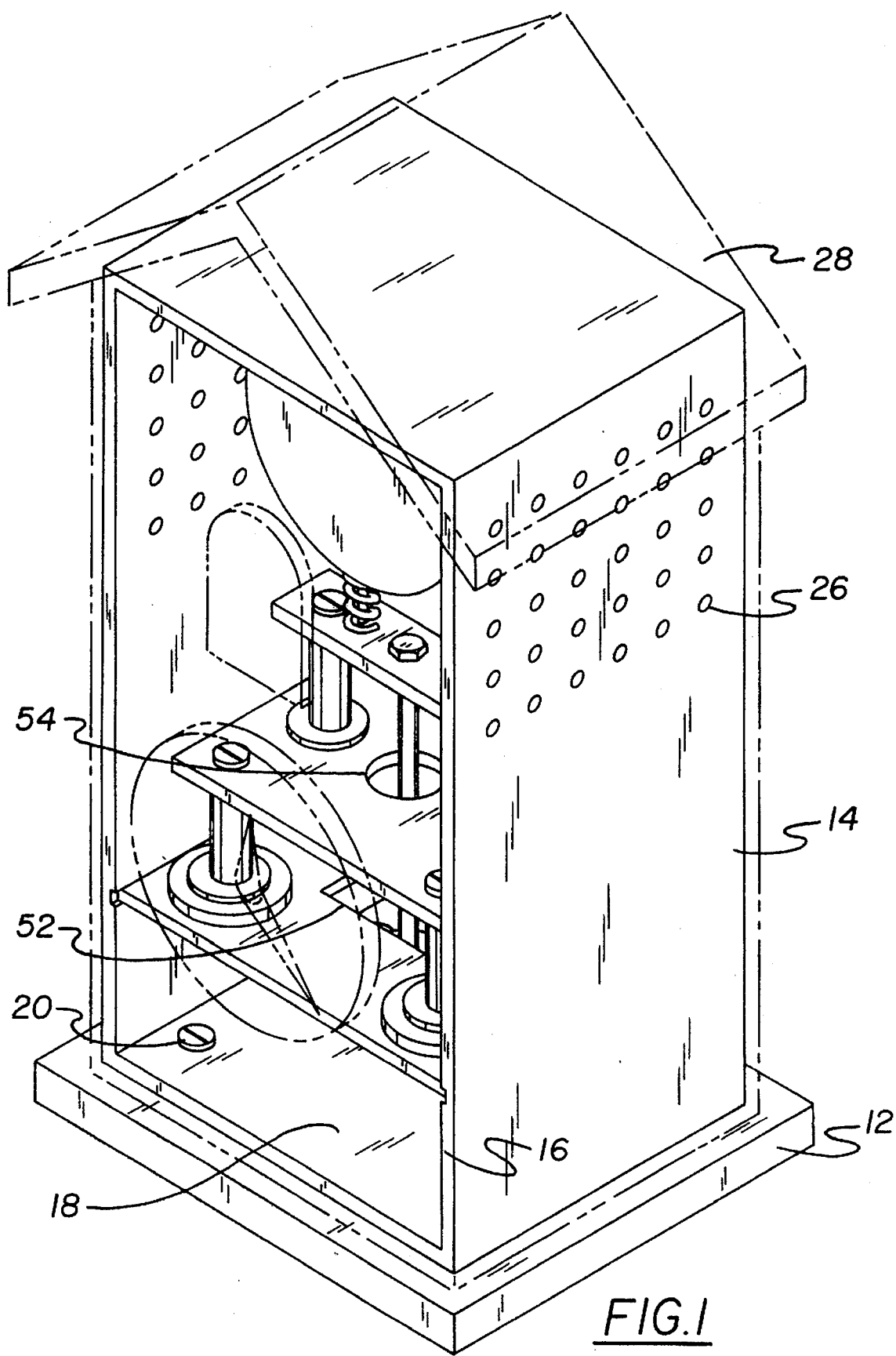
FIG. 1 is a perspective view of the preferred embodiment constructed in accordance with the principles of the present invention.

With reference now to the drawings, and in particular, to FIG. 1 thereof, the preferred embodiment of the new and improved earthquake detector embodying the principles and concepts of the present invention and generally designated by the reference number 10 will be described.

The preferred embodiment of the present invention comprises a plurality of components. In their broadest context, such components include a platform, housing, frame, alarm mechanism, spring mechanism, and counterweight. Such components are individually configured and correlated with respect to each other to provide the intended function of detecting earthquakes.

Specifically, the present invention includes a platform 12. The platform is planar and rectangular in structure. The platform is fixedly coupleable to a recipient and generally horizontal surface for receiving vibrations generated as a result of an earthquake. Alternatively, the platform can be mounted directly and generally perpendicular to a substantially vertical surface with brackets. Preferably, the platform has a width of about 8 inches and a length of about 6 inches.

A rigid plastic box-shaped housing 14 is included. The housing has an open front 16, a bottom wall 18 coupled to the upper surface of the platform with screws 20, and a back wall 22. A pair of opposed and perforated side walls 24 with a matrix of perforations 26 formed thereon are coupled to the top wall, bottom wall, and back wall. A peaked roof 28 formed of two rectangular plates joined at an apex can also be secured to the top wall to protect the housing from the elements or add an ornamental effect, as shown in FIG. 1. Preferably, the housing has a height of about 10½ inches, a length of about 6 inches, and a thickness of about 5 inches.

Figure 4:
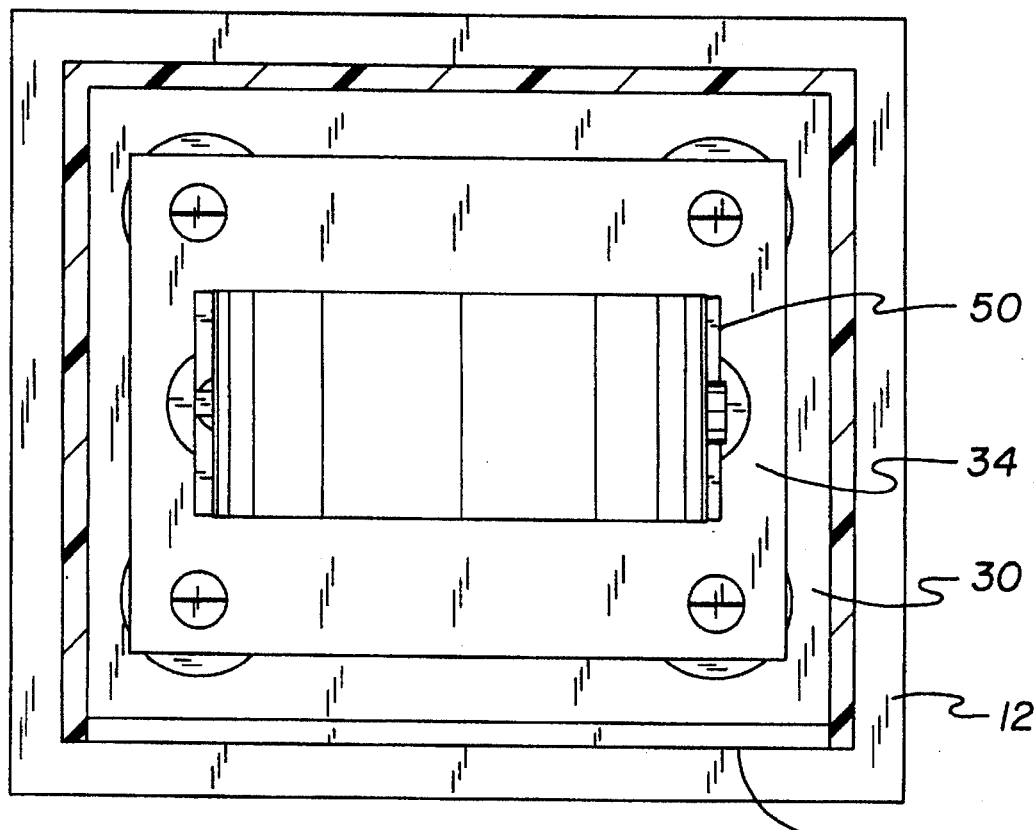
FIG. 4 is a cross-sectional view of the present invention taken along the line 4—4 of FIG. 2.
Figure 6:
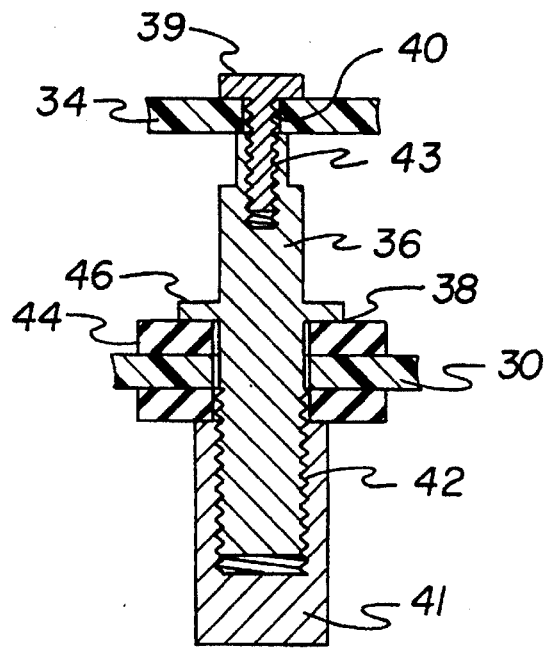
FIG. 6 is a cross-sectional view of the present invention taken along the line 6—6 of FIG. 3.

As illustrated in FIG. 2, a frame is disposed within the housing. The frame has a central axis to which is aligned a planar rectangular rigid horizontal bottom shelf 30. The bottom shelf is fixedly coupled between the side walls of the housing through use of a pair of grooves 32. The frame also includes an axially aligned and planar rectangular rigid horizontal intermediate shelf 34. The intermediate shelf is located above and coupled to the bottom shelf as in FIG. 4. As best shown in FIG. 6, this coupling is performed with a central stud 36 that is secured within a bore 38 formed on the bottom shelf. A screw 39 is disposed through a bore 40 formed on the intermediate shelf and secured with a threaded bore 43 on an upper extent of the stud. A nut 41 is secured to an outwardly threaded portion on the lower end 42 of the stud. A rubber ring is disposed around the stud and placed in contact with its collar 46. The rubber rings help to dampen excess vibrations of the shelves.

Lastly, an axially aligned planar rectangular rigid horizontal top shelf 50 is positioned above and coupled to the intermediate shelf using the same structure as previously described and shown in FIG. 6. The bottom shelf of the frame has a rectangular axial bore 52 disposed therethrough. In addition, the intermediate shelf has a circular and axial bore 54 disposed therethrough and a dimension that is smaller than that of the bottom shelf. The top shelf has a dimension smaller than that of the intermediate shelf. The positioning of the shelves defines a generally pyramidic arrangement 60 as shown in FIG. 3.

Disposed within the housing at a location above the frame is an alarm mechanism 70. The alarm mechanism is formed of a commercially available battery operated TELKO Model S084 electronic motion detector. The alarm mechanism is used for sounding an alarm when vibrated at a level that exceeds about 3.0 on the Richter Scale. As shown in FIG. 2, the motion detector has an ON/OFF switch 72, volume control 74, and an access door 76 through which batteries may be emplaced or removed. The detector also has a pair of mounting pegs 78 extended downwards from a generally disc-shaped plastic housing 80. When the motion detector is activated, it generates an audible noise which is projected through the perforations 26 of the housing.

Figure 5:
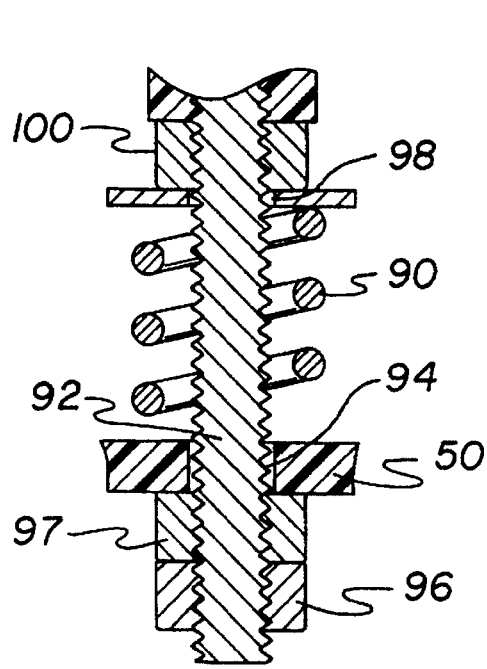
FIG. 5 is a cross-sectional view of the present invention taken along the line 5—5 of FIG. 2.

A spring mechanism formed of two helical springs 90 is coupled between the frame and the alarm mechanism 70. The spring mechanism transfers vibrations to the alarm mechanism when the platform and frame are shaken. As shown in FIG. 5, each spring is held in place by a threaded cylindrical stud 92 that is coupled to a mounting peg 78 and disposed through a bore 94 on the top shelf. The lower end of the stud 92 is secured within the bore 94 through the use of nuts 96, 97. The upper end of the stud is held in place with a plastic spacer 98 and biased by a hexagonal nut 100.

Lastly, a rigid counterweight 110 is disposed within the housing. The counterweight is used for damping frame vibration. As shown in FIG. 2, the counterweight has an upper end 112 coupled to the top shelf with nuts 114, 116. The counterweight also has a central shaft portion 118 that is extended downwards through the bores 52, 54 of the shelves. A bumper 120 formed of a plurality of annular rings is coupled to the shaft portion at a location between the bottom shelf 30 and the intermediate shelf 34. The shaft is terminated at a lower end that has a spherical heavy bob 124 secured thereto.

In the event of an earthquake, vibrations are transferred from the platform, through the frame and spring means to the alarm mechanism. Once the vibrations exceed a level of about 3.0 on the Richter Scale, the alarm mechanism transmits an audible noise. This noise warns proximally positioned users of impending danger due to an earthquake. The alarm mechanism can be deactivated by use of the ON/OFF switch 72. The present invention is of a size such that it can be readily transported for use in a variety of different locations.

What has been described is an earthquake detector that sounds an alarm when an earthquake above a level of 3.0 on the Richter scale is detected. The present invention includes a motion sensor that is mounted on a spring loaded frame with a counterweight suspended from the motion sensor below the spring loaded frame. The spring loaded frame is mounted on a fixed platform. When an earthquake starts, the vibrations will shake housing and thus the frame and the motion sensor held therein. The motion will shake the spring mounted motion sensor to provide an audible alarm. The present invention is inexpensive to build. The alarm of the present invention increases in intensity as the earthquake increases in intensity. The present invention can be mounted flush on a wall or ceiling or surface mounted on a ceiling or solid counter top. The present invention is thus a way to warn people when an earthquake is reaching a level where damage and destruction is imminent. The present invention thus allows people to feel safer and have more at peace of mind when in an area where an earthquake may strike. The present invention thus provides a simple warning system for earthquakes that can be readily used by consumers. The platform, housing, and frame can be made of rigid metal, wood, plastic, or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An earthquake detector for detecting earthquakes comprising, in combination:

a planar rectangular platform fixedly coupleable to a recipient surface for receiving vibrations generated as a result of an earthquake;

a rigid box-shaped housing having an open front, a bottom wall coupled to the platform, a back wall, and a pair of opposed and perforated side walls that are coupled to the top wall, bottom wall, and back wall;

a frame disposed within the housing, the frame having a central axis, an axially aligned planar rectangular horizontal rigid bottom shelf fixedly coupled between the side walls of the housing, an axially aligned planar rectangular horizontal rigid intermediate shelf located above and coupled to the bottom shelf, and an axially aligned planar rectangular horizontal rigid top shelf located above and coupled to the intermediate shelf, and wherein the bottom shelf has a rectangular axial bore disposed therethrough, the intermediate shelf has a circular axial bore disposed therethrough and a dimension smaller than that of the bottom shelf, and the top shelf has a dimension smaller than that of the intermediate shelf, and wherein the positioning of the shelves defines a generally pyramidic arrangement, alarm means disposed within the housing at a location above the frame for sounding an alarm when vibrated at a level that exceeds about 3.0 on the Richter scale;

spring means coupled between the frame and the alarm means for transferring vibrations to the alarm means when the platform and frame are shaken; and a rigid counterweight disposed within the housing for damping frame vibration, the counterweight having an upper end coupled to the top shelf, a central shaft portion extended downward through the bores of the shelves, a bumper coupled to the shaft portion at a location between the bottom shelf and the intermediate shelf, and a lower end with a bob secured thereto.

2. An earthquake detector comprising:

a platform fixedly coupleable to a recipient surface for receiving vibrations generated as a result of an earthquake;

a spring-loaded frame secured to the platform;

alarm means coupled to the spring-loaded frame for providing an alarm when the platform and the frame are shaken, the frame and alarm means being encased in a rigid and perforated housing including a roof; and a counterweight coupled to the frame for damping the vibration of the frame.

3. An earthquake detector comprising:

a platform fixedly coupleable to a recipient surface for receiving vibrations generated as a result of an earthquake;

a spring-loaded frame secured to the platform, the frame comprising a bottom shelf coupled to the platform, a top shelf, and an intermediate shelf therebetween;

alarm means coupled to the spring-loaded frame for providing an alarm when the platform and the frame are shaken, the alarm means sounding when an earthquake exceeds a level of about 3.0 on the Richter scale;

spring means between the top shelf and the alarm means for transferring vibrations to the alarm means; and a counterweight coupled to the frame for damping its vibration.

4. The earthquake detector as set forth in claim 3 wherein the counterweight has an upper end coupled to the top shelf, a central shaft portion, a bumper coupled to the shaft portion, and a lower end with a bob secured thereto.

* * * * *